US012789159B2

(12) United States Patent
Strozyk et al.

(10) Patent No.: US 12,789,159 B2
(45) Date of Patent: Nov. 10, 2026

(54) METHANOL SYNTHESIS REACTOR

(71) Applicant: L'Air Liquide, Société Anonyme pour l'Etude et l'Exploitation des Procédés Georges Claude, Paris (FR)

(72) Inventors: Michael Strozyk, Offenbach (DE); Tobias Oelmann, Bad Vilbel (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 706 days.

(21) Appl. No.: 18/235,191

(22) Filed: Aug. 17, 2023

(65) Prior Publication Data

US 2024/0066489 A1 Feb. 29, 2024

(30) Foreign Application Priority Data

Aug. 26, 2022 (EP) .................................... 22192285

(51) Int. Cl.
*B01J 8/04* (2006.01)

(52) U.S. Cl.
CPC ........... *B01J 8/0453* (2013.01); *B01J 8/0492* (2013.01); *B01J 8/0496* (2013.01); *B01J 2208/0015* (2013.01)

(58) Field of Classification Search
CPC ...... B01J 8/0453; B01J 8/0492; B01J 8/0496; B01J 2208/0015; B01J 2208/0023;
(Continued)

(56) References Cited

U.S. PATENT DOCUMENTS 4,743,432 A 5/1988 Vollhardt
5,507,356 A 4/1996 Roth et al.
(Continued)

FOREIGN PATENT DOCUMENTS

DE 40 32 120 4/1992
DE 43 00 131 7/1995
(Continued)

OTHER PUBLICATIONS

DE-10040209 A1 (Year: 2026).*
European Search Report for corresponding EP 22192285, Mar. 6, 2023.

*Primary Examiner* — Huy Tram Nguyen
(74) *Attorney, Agent, or Firm* — Allen E. White; Elwood L. Haynes

(57) ABSTRACT

The invention relates to a methanol synthesis reactor for producing methanol from a synthesis gas mixture. The reactor according to the invention includes a pressure jacket having an interior in which a first and a second process unit are arranged one atop the other. Both process units are fluidically interconnected at least in respect of the process gases and configured as plate heat exchangers, preferably pillow plate heat exchangers. The plate interiors are traversable from bottom to top by cooling media while the plate interspaces are traversable from top to bottom by process gases, in particular synthesis gas and methanol-containing product streams. At least the first of the two process units has a methanol synthesis catalyst on the plate interspace side. The second process unit is used for cooling or further conversion of the product stream obtainable in the first process unit.

15 Claims, 5 Drawing Sheets

(58) Field of Classification Search
CPC .......... B01J 2208/022; B01J 2219/2453; B01J 2219/2481; B01J 8/0285; B01J 8/048; B01J 19/249; B01J 8/0446; C07C 29/152
USPC .................................................. 422/602, 170
See application file for complete search history.

(56) References Cited

U.S. PATENT DOCUMENTS

| | | | | |
|---|---|---|---|---|
| 5,874,051 | A | 2/1999 | Heil et al. | |
| 6,883,788 | B1 | 4/2005 | Tagamolila et al. | |
| 7,988,936 | B2 * | 8/2011 | Cho | C01B 3/34 422/603 |
| 2002/0048541 | A1 | 4/2002 | Schodel et al. | |
| 2009/0321057 | A1 | 12/2009 | Daly | |
| 2013/0206577 | A1 | 8/2013 | Bauer et al. | |
| 2015/0129185 | A1 | 5/2015 | Abker et al. | |
| 2020/0197890 | A1 | 6/2020 | Castillo-Welter et al. | |

FOREIGN PATENT DOCUMENTS

| | | | | |
|---|---|---|---|---|
| DE | 197 12 148 | | 7/1998 | |
| DE | 198 30 163 | | 1/2000 | |
| DE | 10040209 | A1 * | 2/2002 | C01B 17/803 |
| DE | 101 35 716 | | 2/2003 | |
| DE | 10 2007 031766 | | 2/2008 | |
| DE | 10 2010 026835 | | 1/2012 | |
| DE | 10 2016 005999 | | 11/2017 | |
| EP | 2 845 634 | | 3/2015 | |
| EP | 3 401 299 | | 11/2018 | |
| JP | S60 168530 | | 9/1985 | |

* cited by examiner

METHANOL SYNTHESIS REACTOR

CROSS REFERENCE TO RELATED APPLICATIONS

This application claims the benefit of priority under 35 U.S.C. § 119 (a) and (b) to European Patent Application No. 22192285.9, filed Aug. 26, 2022, the entire contents of which are incorporated herein by reference.

TECHNICAL FIELD OF THE INVENTION

The invention relates to a methanol synthesis reactor, in particular a methanol synthesis reactor comprising at least two integrated process units.

BACKGROUND

In non-integrated solutions for producing condensable reaction products, for example raw methanol, the individual process steps are carried out in separate individual positions or individual apparatuses. For the example of methanol synthesis these process steps consist at least of the reaction of synthesis gas to afford methanol, the cooling of the reaction mixture to condense raw methanol and the separation of the condensed raw methanol from the unreacted synthesis gas (residual gas) and inert constituents of the gas mixture.

When using individual apparatuses, process media of the process unit are introduced via ports into a pressure apparatus and from there into the respective inner apparatus components, distributed or collected there and subsequently discharged. This is effected via dedicated apparatus openings and internals relevant to the respective apparatus, on the one hand, and via connecting elements such as pipe conduits and fittings, and depending on the relative position of the process units, via further conveying means such as pumps, on the other hand.

Combining a plurality of process units accordingly requires a plurality of pressure apparatuses and external pipe conduits which require separate manufacture and installation on foundations or in constructional steelwork within a plant. This leads to high costs in terms of required capital expenditure (CAPEX) and also operating expenditure (OPEX). This is especially due to the multiplicity of required pressure jackets and ports and also pipe conduits and conveying means. These factors result in high pressure drops and heat losses over the associated large total volume and the associated large total surface area and in a higher energy input for the required conveying means.

SUMMARY

It is an object of the present invention to at least least partially overcome the aforementioned disadvantages of the prior art.

It is a further object of the present invention to provide a reactor for synthesis of methanol which makes it possible to reduce the number of connecting pipe conduits, individual pressure jackets and apparatus sumps.

It is a further object of the present invention to provide a reactor for synthesis of methanol which fulfils at least two process functions while having the lowest possible total volume and the lowest possible total surface area.

It is a further object of the present invention to provide a reactor for synthesis of methanol which requires the lowest possible total manufacturing time with respect to fulfilling at least two process functions.

It is a further object of the present invention to provide a reactor for synthesis of methanol which requires the lowest possible number of conveying means, if any, with respect to the process functions to be fulfilled.

It is a further object of the present invention to provide a reactor for synthesis of methanol which is constructed such that material stresses in the metal-based components are minimized.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms “having”, “comprising” or “containing”, etc., do not preclude the possible presence of further elements, ingredients, etc. The indefinite article “a” does not preclude the possible presence of a plurality.

A first aspect of the invention proposes a methanol synthesis reactor for producing methanol from a synthesis gas mixture comprising (a) a pressure jacket having an interior, wherein at least two fluidically interconnected process units are arranged one atop the other in the interior;

(b) a first process unit, wherein the first process unit is configured as a reactor stage RS1 for synthesis of methanol from a synthesis gas stream over a catalyst bed CB1, thus making it possible to produce a methanol-containing product stream RP1, and
 the first process unit is in the form of a plate heat exchanger, wherein the first process unit comprises here a multiplicity of plates arranged vertically and parallel to one another with traversable plate interiors and plate interspaces are present between adjacent plates, wherein
 a solid methanol synthesis catalyst forming the catalyst bed CB1 is arranged in the plate interspaces and
 the first process unit is configured such that the plate interspaces are traversable from top to bottom by the synthesis gas stream and/or by the methanol-containing product stream RP1 and the plate interiors are traversable from bottom to top by a first cooling media stream CM1, thus making
 the methanol-containing product stream RP1 coolable in countercurrent by the first cooling media stream CM1, and wherein
 the first process unit comprises means for withdrawing the methanol-containing product stream RP1 from the first process unit;

(c) a second process unit arranged below the first process unit, wherein
 the second process unit is in the form of a plate heat exchanger, wherein the second process unit comprises here a multiplicity of plates arranged vertically and parallel to one another with traversable plate interiors and plate interspaces are present between adjacent plates, wherein
 the second process unit is configured such that the plate interiors are traversable from bottom to top by a second cooling media stream CM2 and wherein
 (c1) the second process unit is in the form of a cooling stage and configured such that the plate interspaces are traversable from top to bottom by the methanol-containing product stream RP1, thus making the methanol-containing product stream RP1 coolable in countercurrent by the second cooling media stream CM2, or (c2) the second process unit is in the form of a reactor stage RS2 and configured for synthesis of methanol from the methanol-containing product stream RP1 withdrawable from the first process unit over a catalyst bed CB2, thus making it possible to produce a methanol-containing product stream RP2, and wherein a solid methanol synthesis catalyst forming the catalyst bed CB2 is arranged in the plate interspaces and the second process unit is configured such that the plate interspaces are traversable from top to bottom by the methanol-containing product stream RP1 and/or the methanol-containing product stream RP2, thus making the methanol-containing product stream RP2 coolable in countercurrent by the second cooling media stream CM2.

According to the invention a "multiplicity" of plates is to be understood as meaning a plurality of plates, but preferably more than two plates, in particular at least plates, or at least 10 plates, or at least 25 plates, or at least 50 plates.

The at least two process units in the interior of the pressure jacket include the first and the second process unit.

According to the invention at least two process units are integrated in a common pressure jacket. A pressure jacket is to be understood here as meaning an encasing structure which withstands relatively high internal pressures, in particular internal pressures markedly above standard pressure, for example pressures of more than 5 bar.

The first process unit fulfils the function of a reactor stage for synthesis of methanol from a synthesis gas stream introducible into the reactor stage, referred to here as reactor stage RS1. To fulfil this function the first process unit is in the form of a plate heat exchanger. In other words the first process unit has a structure of a plate heat exchanger.

Two adjacent plates of the plate heat exchanger are spaced apart from one another here such that a plate interspace is formed between two adjacent plates.

A solid methanol synthesis catalyst is arranged in the plate interspaces of the first process unit. Here, the entirety of the methanol synthesis catalyst arranged in the plate interspaces of the first process unit forms the catalyst bed, here referred to as catalyst bed CB1.

The methanol synthesis catalyst is a methanol synthesis catalyst known to those skilled in the art, for example based on copper. The methanol synthesis catalyst may here be in the form of a dumped bed or a structured packing for example.

The plate interspaces comprising methanol synthesis catalyst are configured such that they are traversable from top to bottom with the synthesis gas stream and/or the product stream RP1.

In other words the first process unit comprises means configured such that the plate interspaces are traversable from top to bottom with the synthesis gas stream and/or the product stream RP1.

This has the result that an exothermic reaction of the synthesis gas of the synthesis gas stream occurs over the methanol synthesis catalyst of the catalyst bed CB1. This forms the product stream RP1. Accordingly the plate interspaces are also traversable from top to bottom with the product stream RP1.

In particular the methanol-containing product stream RP1 is cooled here in countercurrent by the first cooling media stream CM1 traversing the plate interiors from bottom to top.

The synthesis gas of the synthesis gas stream comprises a carbon oxide, i.e. carbon monoxide or carbon dioxide, or a mixture thereof. The synthesis gas of the synthesis gas stream further comprises hydrogen. The synthesis gas may moreover comprise generally inert constituents or constituents inert under the conditions of methanol synthesis. Examples include nitrogen or methane. The product stream RP1 comprises at least methanol and water as condensable constituents and optionally undesired condensable and non-condensable by-products. The product stream RP1 optionally further comprises unconverted synthesis gas.

The plates of the first process unit have traversable interiors. Here, the interiors of the plates are traversable by a first cooling media stream CM1. Here, the first process unit is configured such that the plate interiors are traversable from bottom to top by the first cooling media stream CM1.

In other words the first process unit comprises means configured such that the plate interiors are traversable from bottom to top by the cooling media stream CM1.

Here, the plate interiors of the first process unit are preferably traversable in the vertical direction, in particular traversable by the first cooling media stream from bottom to top in the vertical direction.

Here, the plate interspaces of the first process unit are preferably traversable in the vertical direction, in particular traversable by the synthesis gas stream and/or the product stream RP1 from top to bottom in the vertical direction.

The second process unit either fulfils the function of a cooling stage or the function of a second reactor stage RS2.

The methanol-containing product stream RP1 is withdrawable from the first process unit configured as reactor stage RS1 and introducible into the second process unit. In the second process unit this product stream RP1 is either cooled (alternative c1) or further converted into a methanol-containing product stream RP2 (alternative c2). In the latter case unconverted synthesis gas in the methanol-containing product stream RP1, i.e. remaining synthesis gas or residual gas, is converted into methanol. To fulfil these alternative functions the second process unit is also in the form of a plate heat exchanger. In other words the second process unit has a structure of a plate heat exchanger.

Two adjacent plates of the plate heat exchanger are spaced apart from one another such that a plate interspace is formed between two adjacent plates.

The plates have traversable interiors which are traversed by a second cooling media stream CM2. Here, the second process unit is configured such that the plate interiors are traversable from bottom to top by the second cooling media stream CM2.

In other words the first process unit comprises means configured such that the plate interiors are traversable from bottom to top by the second cooling media stream CM2.

Here, the plate interiors of the second process unit are preferably traversable by the second cooling media stream CM2 in the vertical direction, in particular traversable by the second cooling media stream from bottom to top in the vertical direction.

According to alternative c1 the second process unit is in the form of a cooling stage. According to this configuration the plate interspaces of the second process unit are traversable from top to bottom by the methanol-containing product stream RP1. In other words the second process unit according to alternative c1 comprises means configured such that the plate interspaces are traversable from top to bottom by the methanol-containing product stream RP1. Here, the plate interspaces are preferably traversable by the methanol-containing product stream RP1 in the vertical direction.

Here, the methanol-containing product stream RP1 is cooled by the second cooling media stream CM2 traversing the plate interiors from bottom to top. Here, the second process unit according to alternative c1 is especially configured such that the methanol-containing product stream RP1 is cooled to such an extent that a condensation of methanol and water from the methanol-containing product stream RP1 is effected.

According to alternative c2 the second process unit is in the form of reactor stage RS2.

According to this configuration c2 a solid methanol synthesis catalyst is arranged in the plate interspaces of the second process unit. Here, the entirety of the methanol synthesis catalyst arranged in the plate interspaces of the second process unit forms the catalyst bed, here referred to as catalyst bed CB2.

The methanol synthesis catalyst is a methanol synthesis catalyst known to those skilled in the art, for example based on copper. The methanol synthesis catalyst may be in the form of a dumped bed or a structured packing for example.

The plate interspaces comprising methanol synthesis catalyst are configured such that they are traversable from top to bottom with the product stream RP1 and/or the product stream RP2. In other words the second process unit comprises means configured such that the plate interspaces are traversable from top to bottom with the product stream RP1 and/or the product stream RP2. This has the result that an exothermic reaction of the product stream RP1 occurs over the methanol synthesis catalyst of the catalyst bed CB2. This forms the product stream RP2. Accordingly the plate interspaces are also traversable from top to bottom with the product stream RP2. In this case the second process unit forms a second reactor stage RS2. This second reactor stage RS2 converts into methanol synthesis gas present in the product stream RP1 which was not convertible into methanol in the first reactor stage RS1 due to the establishment of the thermodynamic equilibrium typical for methanol synthesis. This remaining synthesis gas or residual gas thus forms a portion of the product stream RP1.

The product stream RP2 comprises at least methanol and water as condensable constituents and optionally undesired condensable and non-condensable byproducts. The product stream RP2 optionally further comprises still unconverted synthesis gas.

According to the configuration according to alternative c2 the plate interspaces of the second process unit are traversable from top to bottom by the methanol-containing product stream RP1 and/or methanol-containing product stream RP2. In other words the second process unit according to alternative c2 comprises means configured such that the plate interspaces are traversable from top to bottom by the methanol-containing product stream RP1 and/or the methanol-containing product stream RP2. Here, the plate interspaces are preferably traversable by the methanol-containing product stream RP1 and/or the methanol-containing product stream RP2 in the vertical direction.

Here, the methanol-containing product stream RP2 is cooled in countercurrent by the second cooling media stream CM2 traversing the plate interiors from bottom to top.

The first and second process unit are arranged one atop the other within the pressure jacket, wherein the second process unit is arranged below the first process unit. Both process units are fluidically interconnected. The first and second process unit are in particular fluidically interconnected in terms of the synthesis gas stream and the methanol-containing product streams RP1 and RP2, in particular fluidically interconnected on the side of the plate interspaces.

The first and second process unit are preferably arranged in serial alignment, i.e. along a straight line or axis common to the first and second process unit. The second process unit is thus preferably arranged such that it is not offset relative to the first process unit, and vice versa.

In one embodiment the methanol synthesis reactor is in the form of a one-stage reactor having a reactor stage RS1 at the top and a cooling stage at the bottom. In a further embodiment the methanol synthesis reactor is in the form of a two-stage reactor having a first reactor stage RS1 at the top and a second reactor stage RS2 at the bottom.

The methanol synthesis reactor may moreover include further process units. For example the methanol synthesis reactor according to alternative c1 may have a third process unit in the form of a condenser below the second process unit. In a further example the methanol synthesis reactor according to alternative c1 may have a fourth process unit in the form of a gas-liquid separator below the third process unit. In a further example the methanol synthesis reactor according to alternative c2 may have a third process unit in the form of a cooling stage below the second process unit. In a further example the methanol synthesis reactor according to alternative c2 may have a fourth process unit in the form of a condenser below the third process unit. In a further example the methanol synthesis reactor according to alternative c2 may have a fifth process unit configured as a gas-liquid separator below the fourth process unit. Also conceivable are embodiments in which the cooling stage is already in the form of a condenser so that the cooling stage already effects complete condensation of condensable products and byproducts.

The cooling medium for the first cooling media stream CM1 and/or second cooling media stream CM2 may be any desired suitable gaseous or liquid cooling medium.

The cooling medium for the first process unit is preferably boiling water, in particular boiling boiler feed water. A preferred embodiment of the reactor is therefore characterized in that the first cooling media stream CM1 comprises boiling boiler feed water. The first cooling media stream CM1 is especially evaporable upon traversal of the plate interiors of the first process unit.

In this case the first process unit is in the form of a water-cooled reactor stage RS1 and thus fulfils the function of a water-cooled reactor stage. The cooling medium is especially evaporated by the thermal energy absorbed upon the formation of the methanol-containing product stream RP1. The thermal energy required for evaporation corresponds here to the enthalpy of vaporization of the cooling medium.

The cooling medium for the second process unit is preferably a gaseous cooling medium. In this embodiment the second process unit is either in the form of a gas-cooled cooling stage according to alternative c1 or in the form of a gas-cooled reactor stage RS2 corresponding to alternative c2. In the latter case the second process unit fulfils the function of a gas-cooled reactor stage.

FIG. 5 shows a typical temperature profile of a catalyst bed over the length of a methanol reactor as determined by measurement and by means of a simulation. This temperature profile may be spatially divided into four parts from the inlet into the reactor in the direction of the outlet, as elucidated below.

A first portion of the catalyst bed serves to heat the synthesis gas, with transfer of heat from the coolant to the synthesis gas and the catalyst. In the course of this, the reaction to form methanol gradually commences, in which, owing to the exothermic character of the reaction, heat is generated and the temperature both of the catalyst and of the gas mixture (synthesis gas and gaseous methanol/water, and unreacted synthesis gas) is increased. As the reaction progresses further, the temperature of the catalyst bed and of the gas mixture corresponds roughly to the coolant temperature.

In a second portion of the catalyst bed, the reaction continues, with further generation of heat and further heating of the catalyst bed and the gas mixture. The rate of generation of heat in this second portion of the catalyst bed is faster than the heat transfer from the coolant, such that the temperatures of the gas mixture and of the catalyst bed rise above the temperature of the coolant. The heat generated in the reaction first heats the solid catalyst. Subsequently, heat is transferred from the catalyst to the process gas mixture in order to cool the catalyst. Subsequently, the process gas mixture transfers the heat to the coolant used in the reactor. A further type of heat transfer is convection of heat from the solid catalyst to the reactor internals. The temperature in this portion of the catalyst bed rises well above that of the coolant. In the course of the reaction the reactants of the process gas mixture (carbon oxides and hydrogen) are further consumed and more and more raw methanol is produced as part of the process gas mixture. Since the catalytic methanol synthesis is an equilibrium reaction, the reaction rate and hence also the rate of production of heat approach a limit on attainment of the equilibrium concentration of reactants and products.

In a third portion of the catalyst bed, the rate of production of heat slows, since the reaction is approaching equilibrium conditions. The heat transfer from the catalyst to the process gas mixture and ultimately to the cooling system nevertheless continues, and enables further lowering of the catalyst bed temperature.

In a last, fourth part of the catalyst bed, the reaction is at equilibrium without significant production of heat. In this portion of the catalyst bed, the temperature falls further in the direction of the coolant temperature.

Having regard to the first and the second process unit, it holds true that the plates are arranged vertically and the process gases reacting or to be cooled are passed from top to bottom within the plate interspaces. According to the temperature profile more particularly elucidated hereinabove the temperature on the plate interspace side will thus broadly fall from top to bottom, i.e. a temperature gradient with decreasing temperature from top to bottom is established over the longest region of the process unit. This is in principle even more marked when the plate interspaces of the second process unit are not filled with catalyst as in the case of alternative c1. In this case the temperature of the product stream RP1 in the second process unit continuously decreases over the full length of the process unit from top to bottom with ongoing cooling.

Since the density of a medium at higher temperatures is relatively lower than the density of the same medium at lower temperatures a density gradient from a low density in an upper zone of the reactor or of a process unit to a higher density in a lower zone of the reactor or of a process unit is also established during operation of the reactor. This assists the intended flow direction of the respective process gas mixture on the plate interspace side from top to bottom since heavier components (components having a higher density) collect in a lower region of the reactor or of a process unit due to the effect of gravity. Finally, the intended flow direction of the respective mixture is further also favoured by the vertical arrangement of the plates of the process units.

The advantages of the reactor according to the invention also extend to the conduction of the respective cooling media. According to the invention the cooling media are run from bottom to top on the plate interior side of the traversable plates while the process gas mixture to be respectively cooled is run from top to bottom on the plate interspace side. The cooling medium thus enters into the respective process unit in a lower region and exits therefrom in an upper region. Here, from bottom to top in the flow direction it is continuously warmed and/or continuously converted from a liquid phase into a gaseous phase through the cooling of the process gas mixture. The abovementioned temperature gradient and/or density gradient is thus established not only on the plate interior side but also on the plate interspace side.

In simple terms it is deducible therefrom that the respective process unit is hottest in its top region and coldest in its bottom region. Furthermore, the media of the respective process unit have substantially the lowest density in the top region and the highest density in the bottom region. For alternative c1 this in principle applies for the entire reactor since the second process unit serves merely for cooling. Depending on the configuration of the cooling stage according to alternative c2 the mixture on the plate interspace side is also more or less prone to condensation.

The combination of the abovementioned effects makes it possible in respect of the reactor according to the invention to completely dispense with forced-flow conveying means, for example pumps, both in respect of the process gas mixtures on the plate interspace side (synthesis gas stream and product streams RP1 and RP2) and in respect of the cooling media on the plate interior side.

If the cooling medium of the first process unit is boiling water, in particular boiling boiler feed water, then the thermal energy required for evaporation corresponds to the enthalpy of vaporization of the cooling medium. Since the apparatus is hot in an upper zone on account of the abovementioned effects during operation, evaporation in the upper zone is favoured. As mentioned above this causes a density gradient with a low density in the upper zone and high density in the lower zone to be established on the plate interior side of the first process unit. This results in the so-called thermosiphon effect allowing natural circulation of the cooling medium without which a conveying means with forced circulation would be required as described above.

Thus in advantageous fashion through the establishment of abovementioned temperature and density gradients the warming cooling medium is “drawn” upwards within the plate interiors of the first and/or second process unit, while the cooling and/or condensing process gas mixture on the side of the plate interspaces of the first and/or second process unit “falls” downwards.

The temperature gradient established in operation by the inventive arrangement of the first and second process unit and the inventive flow management is observed not only in the flowing media but correspondingly also in the metallic structures of the apparatus since the heat of the media is correspondingly transferred to the metallic structures. Since the temperature gradient continuously also declines from an upper region to a lower region in the metallic structures of the apparatus and exhibits substantially no temperature spikes, possible thermal stresses due to locally occurring large temperature differences are reduced to a minimum. The first and second process unit and the pressure jacket are in particular manufactured from a metal or a metal alloy. It is preferable when at least the media-conducting components of the first and second process unit and the pressure jacket are manufactured from a metal or a metal alloy.

One embodiment of the reactor according to the invention is characterized in that the plates of the first process unit and/or the plates of the second process unit are in the form of pillow plates.

Pillow plates instead of conventional straight heat exchanger plates provide advantages in respect of mechanical stability and efficiency of the heat transfer especially in terms of the apparatus according to the invention. An improvement in the efficiency of the heat transfer relative to conventional plates results especially with regard to the production of steam on the plate inner surfaces upon reaching the nucleation point and the subsequent steam bubble formation resulting therefrom. Pillow plate heat exchangers are more particularly described in DE 10 2016 005 999 A1, for example.

One embodiment of the reactor according to the invention is characterized in that the second process unit is configured such that the plate interiors are traversable by the synthesis gas stream, wherein the synthesis gas stream fulfils the function of the second cooling media stream CM2, thus making it possible to produce a preheated synthesis gas stream.

In order to minimize the use of coolant the synthesis gas stream provided for the methanol synthesis is advantageously used as coolant CM2 in the second process unit. In this case the second process unit either fulfils the function of a gas-cooled cooling stage (alternative c1) or the function of a gas-cooled reactor stage (alternative c2). Here, the synthesis gas stream is advantageously preheated, thus improving the heat integration of the reactor according to the invention. After introducing the preheated synthesis gas stream to the plate interspace side of the first process unit to produce the methanol-containing product stream RP1 the temperature required for the reaction over the catalyst is reached more quickly. It is additionally possible to dispense with an external apparatus for preheating the synthesis gas stream, for example with a preheater.

One embodiment of the reactor according to the invention is therefore characterized in that the methanol synthesis reactor comprises means for discharging the preheated synthesis gas stream from the second process unit and comprises means for introducing the preheated synthesis gas stream into the first process unit to produce the methanol-containing product stream RP1.

One embodiment of the reactor according to the invention is characterized in that the plate interiors of the first process unit and the plate interiors of the second process unit are arranged at least partially in serial alignment and/or the plate interspaces of the first process unit and the plate interspaces of the second process unit are arranged at least partially in serial alignment.

The term "arranged in serial alignment" is to be understood here as meaning that two plates of the first and second process unit arranged in series in the flow direction of the process media (synthesis gas stream, methanol-containing product stream RP1, methanol-containing product stream RP2) are in respect of the longitudinal axes of the plate interiors or plate interspaces thereof arranged along these longitudinal axes.

This arrangement is especially effected without the respective plate of the first process unit being arranged offset relative to the plate of the second process unit in respect of the relevant longitudinal axis.

It is further preferable when the two serially arranged plates of the first and second process unit are arranged here such that in the case of identical cross sectional areas these are arranged congruently in respect of these cross sectional areas, i.e. their two cross sectional areas are coincident when they would be displaced along the longitudinal axis and aligned.

Here, the reactor is preferably configured such that the aligned arrangement applies to all plates of the first process unit relative to all plates of the second process unit. That is to say each plate of the first process unit has a plate arranged in serial alignment thereto as a counterpart in the second process unit.

The measure of the aligned arrangement makes it possible to minimize the volume of the reactor according to the invention. In other words the ratio of the claimed volume to the usable surface area made available is minimized. The usable surface area is to be understood here as meaning the surface area which may be utilized for cooling the process media via the cooling media or for synthesis of methanol from the process media.

One embodiment of the reactor according to the invention is characterized in that the methanol synthesis reactor comprises a support structure, wherein the support structure is in the form of a propping means which is at least partially arranged below a process unit and/or in the form of a suspending means which is at least partially arranged above a process unit and thus forms a mechanical connection between a process unit and the pressure jacket.

In the context of the invention a "support structure" may alternatively also be referred to as a "support element".

The reactor according to the invention preferably comprises at least one support structure. The support structure forms a mechanical connection between a process unit and the pressure jacket. The mechanical connection represents a fixing point between a process unit and the pressure jacket.

Depending on the configuration it may be sufficient for the entire reactor to have a single support structure which forms a mechanical connection between a process unit and the pressure jacket. Two or more such support structures may also be required, for example one support structure per process unit. The mechanical connection between the respective process unit and the pressure jacket may be a friction-locked connection and/or an atomic-level connection. One example of a friction-locked connection is a screw connection. One example of an atomic-level connection is a weld connection.

The support structure is in the form of a suspending means or in the form of a propping means. In the case of a suspending means the support structure is arranged at least partially, i.e. partially or completely, above the respective process unit. In the case of a propping means the support structure is arranged at least partially, i.e. partially or completely, below the respective process unit. In one embodiment the propping means is arranged completely below a process unit and the suspending means is arranged completely above a process unit.

It is advantageous to arrange the respective support structures not completely next to a respective process unit but rather at least partially above or below a process unit and to mechanically connect it with the respective process unit and the pressure jacket. As a result, and especially in the case of an arrangement completely above or below a process unit, the support structures or connecting elements may be positioned at a point where they do not significantly affect the internal diameter of the reactor. The parallel attachment, i.e. attachment at the same height of the plates of the process unit between the process unit and the wall of the jacket, would markedly increase the cross section of the reactor, especially in terms of the diameter of the pressure jacket. According to Barlow's formula the pressure jacket would need to be accordingly thicker-walled which would be disadvantageous.

Furthermore, the arrangement of the support structures at least partially above and/or at least partially below a process unit, especially entirely above and/or below a process unit, makes it possible to design an individual plate width for each of the heat exchanger plates. This allows an especially round cross sectional area (area of a disc) of the pressure jacket to be most effectively utilized.

One embodiment of the reactor according to the invention is characterized in that the first process unit has a support structure which is arranged at least partially below the first process unit and is in the form of a propping means and the second process unit has a support structure which is arranged at least partially above the second process unit and is in the form of a suspending means.

In this embodiment the first, i.e. upper, process unit is connected to the pressure jacket via a support structure in the form of a propping means. In addition, the second, i.e. lower, process unit is connected to the pressure jacket via a support structure in the form of a suspending means. Each of the process units thus has a dedicated support structure. In certain reactor configurations this results in an advantageous two-part distribution of the loads of the process units within the pressure jacket.

The propping means is preferably arranged in the lower region of the first process unit, i.e. at the bottom region of the first process unit, and in this region establishes a mechanical connection of the first process unit to the pressure jacket. The elements for forming the mechanical connection between the process unit and the pressure jacket are correspondingly and preferably also arranged in the lower region or at the bottom region of the first process unit.

The suspending means is preferably arranged in the upper region of the second process unit, i.e. at the top region of the second process unit, and in this region establishes a mechanical connection of the second process unit to the pressure jacket. The elements for forming the mechanical connection between the process unit and the pressure jacket are correspondingly and preferably also arranged in the upper region or at the top region of the second process unit.

Due to possible different materials used for the pressure jacket and the plates of the first and second process unit and generally different temperatures between process units and the pressure jacket, different relative expansions of these two elements can occur during reactor operation which can lead to different upward and downward length increases of these elements. In this case it is advantageous when the plates of the first process unit and optionally further components mechanically connected to these plates can freely expand upwards. It is further advantageous when the plates of the second process unit and optionally further components mechanically connected to these plates can freely expand downwards. With increasing temperature the two process units thus correspondingly grow in opposite directions upwards (first process unit) and downwards (second process unit). Here, the mechanical fixing points of the suspending means and the propping means are arranged close to one another on the pressure jacket. Stresses resulting from different temperature expansion between these fixing points are thus kept low since the distance between the fixing point of the upper propping means and the fixing point of the lower suspending means is low.

One embodiment of the reactor according to the invention is characterized in that the first process unit has a support structure which is arranged at least partially above the first process unit and is in the form of a suspending means, and wherein the first and the second process unit are mechanically connected to one another via a connecting element.

In particular the connecting element establishes no mechanical connection between the first process unit and the pressure jacket and no mechanical connection between the second process unit and the pressure jacket.

In this embodiment the first, i.e. upper, process unit is connected to the pressure jacket via a support structure in the form of a suspending means. Thus only the first process unit has a dedicated support structure. In certain reactor configurations this results in an advantageous one-part distribution of the loads of both process units downwards within the pressure jacket.

The suspending means is preferably arranged in the upper region of the first process unit, i.e. at the top region of the first process unit, and in this region establishes a mechanical connection of the first process unit to the pressure jacket. The elements for forming the mechanical connection between the process unit and the pressure jacket are correspondingly and preferably also arranged in the upper region or at the top region of the first process unit.

In this embodiment with a suspending means as a support structure for the first process unit and a connecting element between the first and the second process unit the entire construction comprising the heat transfer plates of the first and the second process unit and further components mechanically connected thereto may freely expand downwards when the temperature increases during reactor operation.

In this purely suspended construction of the first and second process unit within the pressure jacket the fixing to the pressure jacket is mechanically more complex since additional weight acts on the mechanical connection.

However, especially when using boiling boiler feed water as cooling medium CM1 for the first process unit this embodiment may be advantageous. In the first process unit which is configured as reactor stage RS1, certain reactor configurations produce large amounts of steam on the plate inner surface, wherein the steam exits the first process unit due to the conduction of the cooling medium CM1 from bottom to top at the top region of the first process unit. The cooling media feed conduit tends to have a smaller cross section than the steam-conducting cooling media discharge conduit. A smaller cross section is associated with a smaller wall thickness of the feed conduit, thus allowing the feed conduit to be made flexible more easily than the discharge conduit. It is accordingly advantageous to make the bottom region of the first process unit flexible and the top region rigid by contrast. The former is realized by means of the flexible connecting element between the first and the second process unit which is not mechanically connected to the pressure jacket and the latter by the support structure realized as a suspending means in the top region of the first process unit.

To further reduce the stresses the cooling media feed conduit may be conducted parallel to the plates of the first process unit. Here, the cooling media inlet port for the cooling medium CM1 is arranged in the top region of the first process unit and the conduit is subsequently run downwards preferably vertically.

One embodiment of the reactor according to the invention is characterized in that the second process unit has a support structure which is arranged at least partially below the second process unit and is in the form of a propping means, and wherein the first and the second process unit are mechanically connected to one another via a connecting element.

In particular the connecting element provides no mechanical connection between the first process unit and the pressure jacket and no mechanical connection between the second process unit and the pressure jacket.

In this embodiment the second, i.e. lower, process unit is connected to the pressure jacket via a support structure in the form of a propping means. Thus only the second process unit has a dedicated support structure. In certain reactor configurations this results in an advantageous one-part distribution of the loads of both process units upwards within the pressure jacket.

The propping means is preferably arranged in the lower region of the second process unit, i.e. in the bottom region of the second process unit, and in this region establishes a mechanical connection of the second process unit to the pressure jacket. The elements for forming the mechanical connection between the process unit and the pressure jacket are correspondingly and preferably also arranged in the lower region or in the bottom region of the second process unit.

In this embodiment with a propping means as a support structure for the second process unit and a connecting element between the first and the second process unit the entire construction comprising the heat transfer plates of the first and the second process unit and further components mechanically connected thereto may freely expand upwards when the temperature increases during reactor operation.

One embodiment of the reactor according to the invention is characterized in that the methanol synthesis reactor comprises a synthesis gas inlet port extending through the pressure jacket, wherein the synthesis gas inlet port is fluidically connected to the plate interiors of the second process unit and is configured for introducing the synthesis gas stream into the second process unit.

This embodiment is relevant for the case where the synthesis gas stream is used as coolant on the plate interior of the second process unit. The synthesis gas inlet port is then preferably arranged at the bottom region of the second process unit and preferably extends through the pressure jacket in the horizontal direction.

When the second process unit is not operated with synthesis gas as coolant CM2 the synthesis gas inlet port is preferably arranged at the top region of the first process unit and preferably extends through the pressure jacket in the horizontal direction.

One embodiment of the reactor according to the invention is characterized in that the second process unit comprises in its bottom region a distributor system which is fluidically connected to the synthesis gas inlet port and the plate interiors of the second process unit and is configured for distributing the synthesis gas stream entering via the synthesis gas inlet port to the plate interiors of the second process unit.

One embodiment of the reactor according to the invention is characterized here in that the second process unit comprises in its top region a collector system which is fluidically connected to the plate interiors of the second process unit and is configured for collecting the preheated synthesis gas stream exiting from the plate interiors of the second process unit.

Having regard to the cooling media stream CM2 the second process unit preferably comprises in its top region a collector system which is fluidically connected to the plate interiors of the second process unit and is configured for collecting the cooling media stream CM2 exiting from the plate interiors of the second process unit.

One embodiment of the reactor according to the invention is characterized in that the first process unit comprises in its top region a distributor system which is fluidically connected to the collector system of the second process unit and is configured for distributing the preheated synthesis gas to the plate interspaces of the first process unit.

If the synthesis gas stream is not used as a cooling media stream CM2 in the second process unit the first process unit preferably comprises in its top region a distributor system configured for distributing the synthesis gas of the synthesis gas stream to the plate interspaces of the first process unit.

One embodiment of the reactor according to the invention is characterized in that the collector system of the second process unit and the distributor system of the first process unit are connected via a conduit bypassing the first process unit and at least partially running inside the pressure jacket.

This embodiment is relevant when the synthesis gas stream is used as cooling media stream CM2 in the second process unit and the collector system of the first process unit and the distributor system of the first process unit need to be connected to one another via a corresponding conduit. It is then advantageous to run this conduit such that it bypasses the first process unit between the pressure jacket and this first process unit and in particular runs here parallel to the plates of the first process unit.

One embodiment of the reactor according to the invention is characterized in that the methanol synthesis reactor comprises a cooling media inlet port extending through the pressure jacket, wherein the cooling media inlet port is fluidically connected to the plate interiors of the first process unit and is configured for introducing the cooling media stream CM1 into the first process unit.

One embodiment of the reactor according to the invention is characterized here in that the first process unit comprises in its bottom region a distributor system which is fluidically connected to the cooling media inlet port and the plate interiors of the first process unit and is configured for distributing the cooling media stream CM1 entering via the cooling media inlet port to the plate interiors of the first process unit.

Having regard to the first process unit the cooling media stream CM1 preferably comprises boiling boiler feed water.

One embodiment of the reactor according to the invention is characterized in that the methanol synthesis reactor comprises a cooling media outlet port extending through the pressure jacket, wherein the cooling media outlet port is fluidically connected to the plate interiors of the first process unit and is configured for discharging the cooling media stream CM1 from the first process unit.

When using boiling boiler feed water for the cooling media stream CM1 the discharged cooling media stream CM1 comprises in particular steam.

One embodiment of the reactor according to the invention is characterized here in that the first process unit comprises in its top region a collector system which is fluidically connected to the cooling media outlet port and the plate interiors of the first process unit and is configured for collecting the cooling media stream CM1 exiting from the plate interiors of the first process unit.

One embodiment of the reactor according to the invention is characterized in that the methanol synthesis reactor comprises a product stream outlet port extending through the pressure jacket, wherein the product stream outlet port is fluidically connected to the plate interspaces of the second process unit and is configured for discharging the methanol-containing product stream RP1 and/or the methanol-containing product stream RP2 from the second process unit.

In the case of alternative c1 the product stream outlet port is configured for discharging the methanol-containing product stream RP1 from the second process unit. In the case of alternative c2 the product stream outlet port is configured for discharging the methanol-containing product stream RP2 from the second process unit.

One embodiment of the reactor according to the invention is characterized in that the second process unit comprises in its bottom region a collector system which is fluidically connected to the product stream outlet port and the plate interspaces of the second process unit and is configured for collecting the methanol-containing product stream RP1 and/or methanol-containing product stream RP2 exiting the plate interspaces of the second process unit.

In the case of alternative c1 the collector system is configured for collecting the methanol-containing product stream RP1 exiting the plate interspaces of the second process unit. In the case of alternative c2 the collector system is configured for collecting the methanol-containing product stream RP2 from the plate interspaces of the second process unit.

One embodiment of the reactor according to the invention is characterized in that an interspace region is arranged within the pressure jacket between the first process unit and the second process unit, wherein the interspace region is fluidically connected to the plate interspaces of the first process unit and the plate interspaces of the second process unit and is configured for transferring the methanol-containing product stream RP1 from the first process unit into the second process unit.

Here, the interspace region may comprise a collector system which is fluidically connected to the plate interspaces of the first process unit and is configured for collecting the methanol-containing product stream RP1 exiting the plate interspaces of the first process unit.

The interspace region may further comprise a distributor system which is fluidically connected to the plate interspaces of the second process unit and is configured for distributing the methanol-containing product stream RP1 to the plate interspaces of the second process unit.

Here, the collector system of the first process unit and the distributor system of the second process unit of the interspace region are fluidically interconnected.

BRIEF DESCRIPTION OF THE DRAWINGS

The invention is hereinbelow more particularly elucidated by exemplary embodiments. In the following detailed description reference is made to the accompanying figures which form a part of the exemplary embodiments and which contain an illustrative representation of specific embodiments of the invention. In this connection, direction-specific terminology such as “top”, “bottom”, “front”, “back”, etc., is used with reference to the orientation of the described figure. Since components of embodiments may be positioned in a multiplicity of orientations, the direction-specific terminology is used for elucidation and is in no way limiting. A person skilled in the art will appreciate that other embodiments may be used and structural or logical changes may be undertaken without departing from the scope of protection of the invention. The following detailed description is therefore not to be understood in a limiting sense, and the scope of protection of the embodiments is defined by the accompanying claims. Unless otherwise stated, the drawings are not true to scale.

In the following description and in the drawings identical elements are described with identical reference numerals. Arrows illustrate the flow direction of the process media, i.e. of the synthesis gas stream and the methanol-containing product streams RP1 and RP2 and the cooling media CM1 and CM2.

In the figures:

Figure 1:
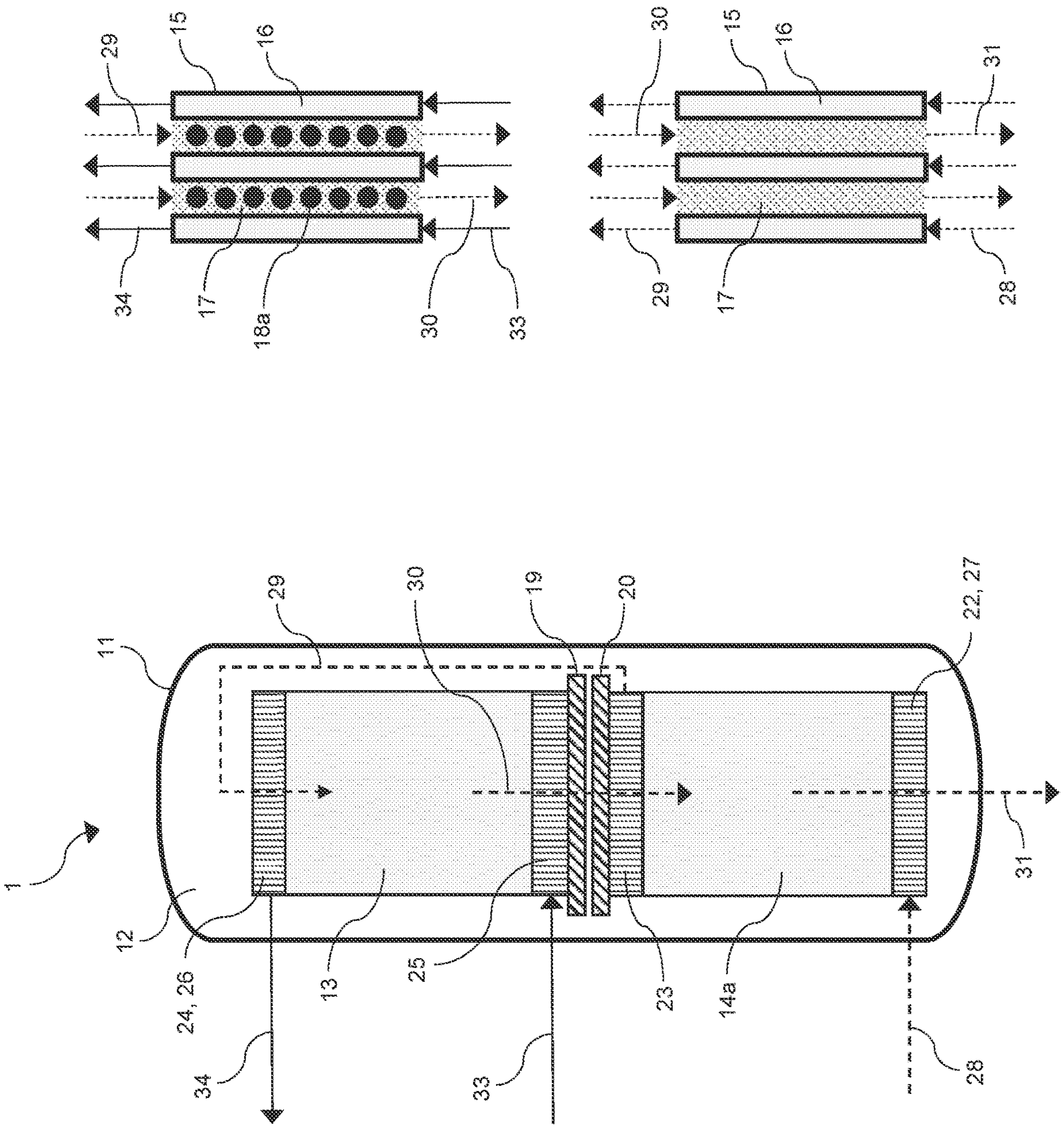
Figure 2:
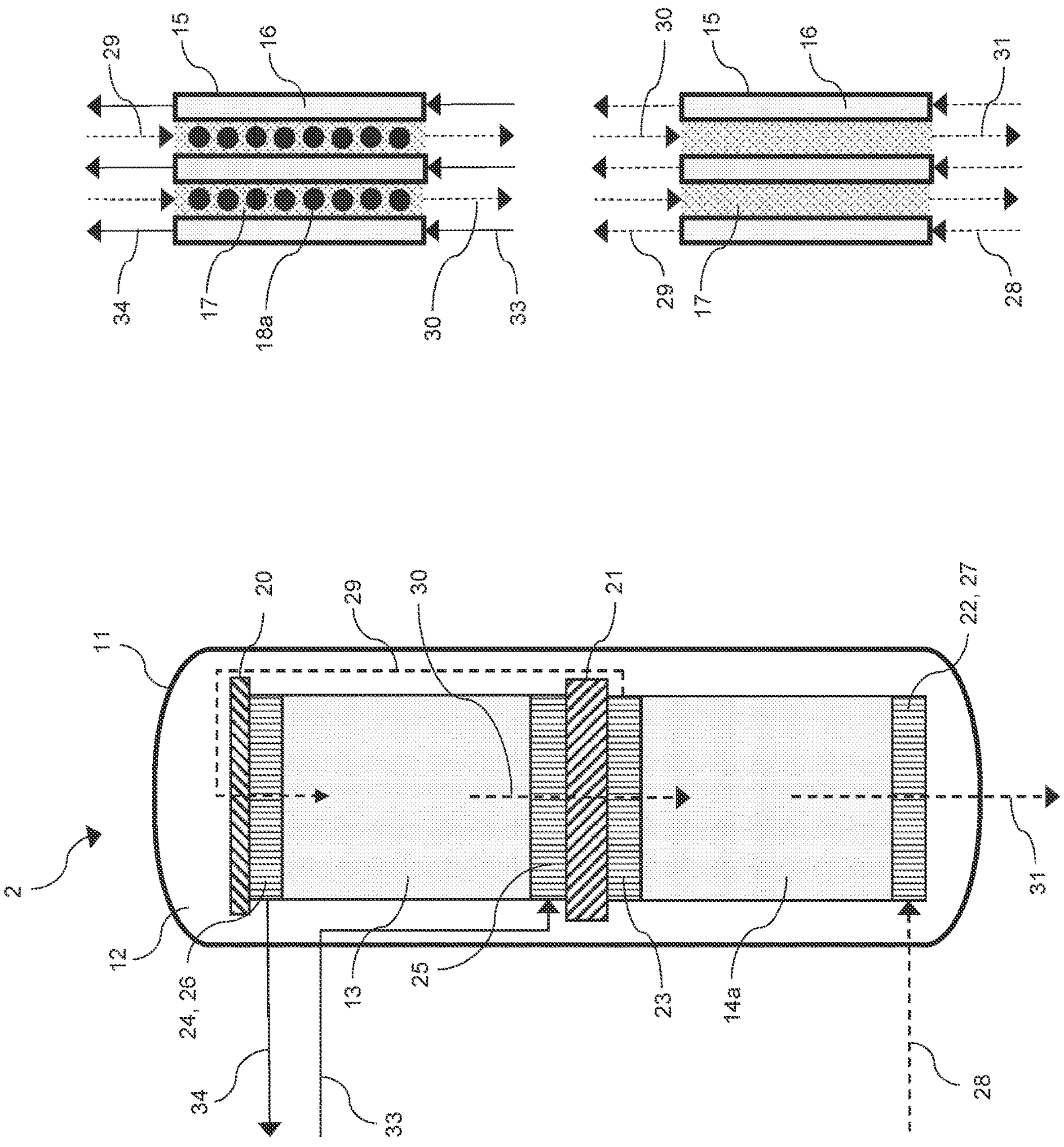
Figure 3:
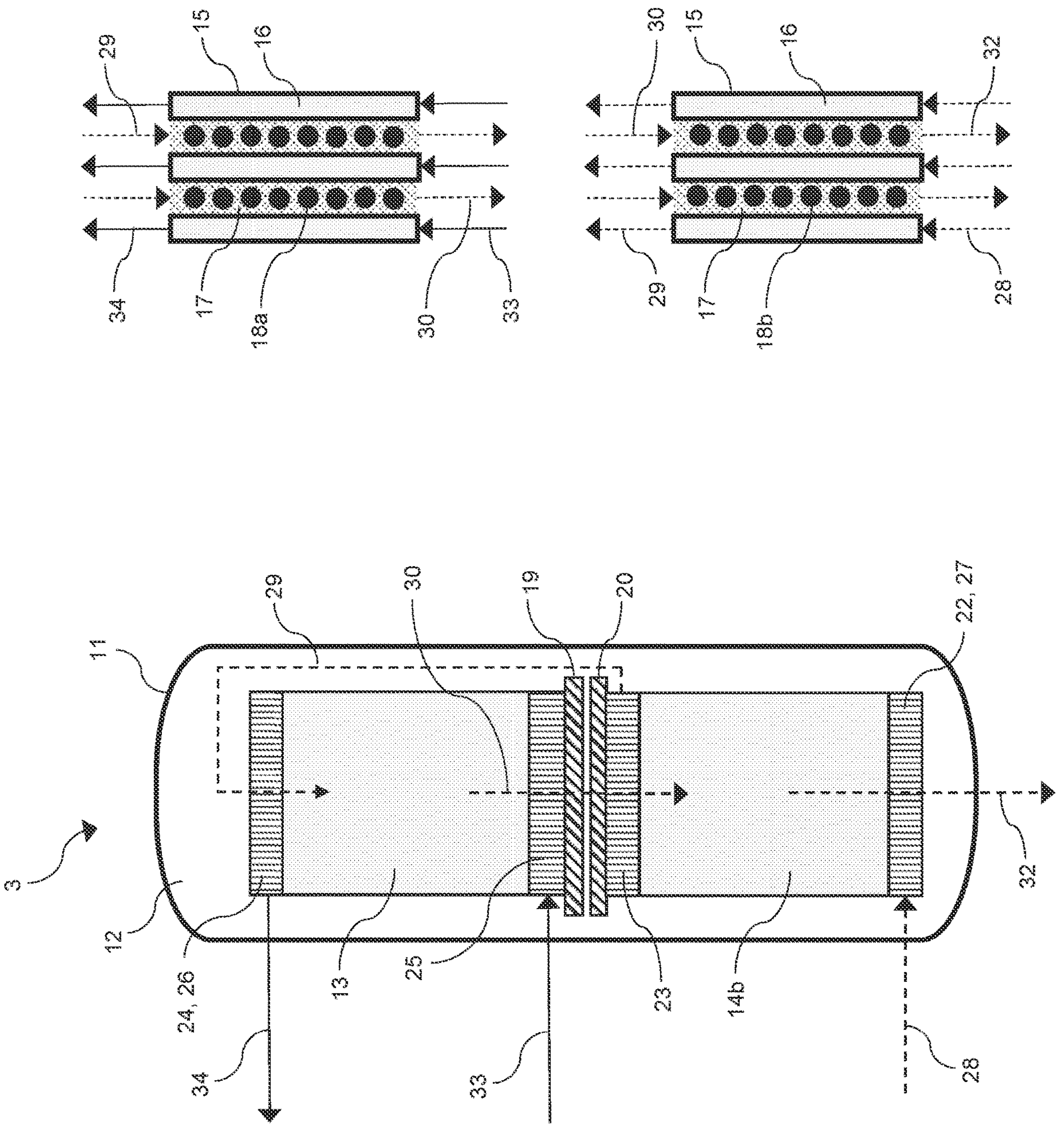
Figure 4:
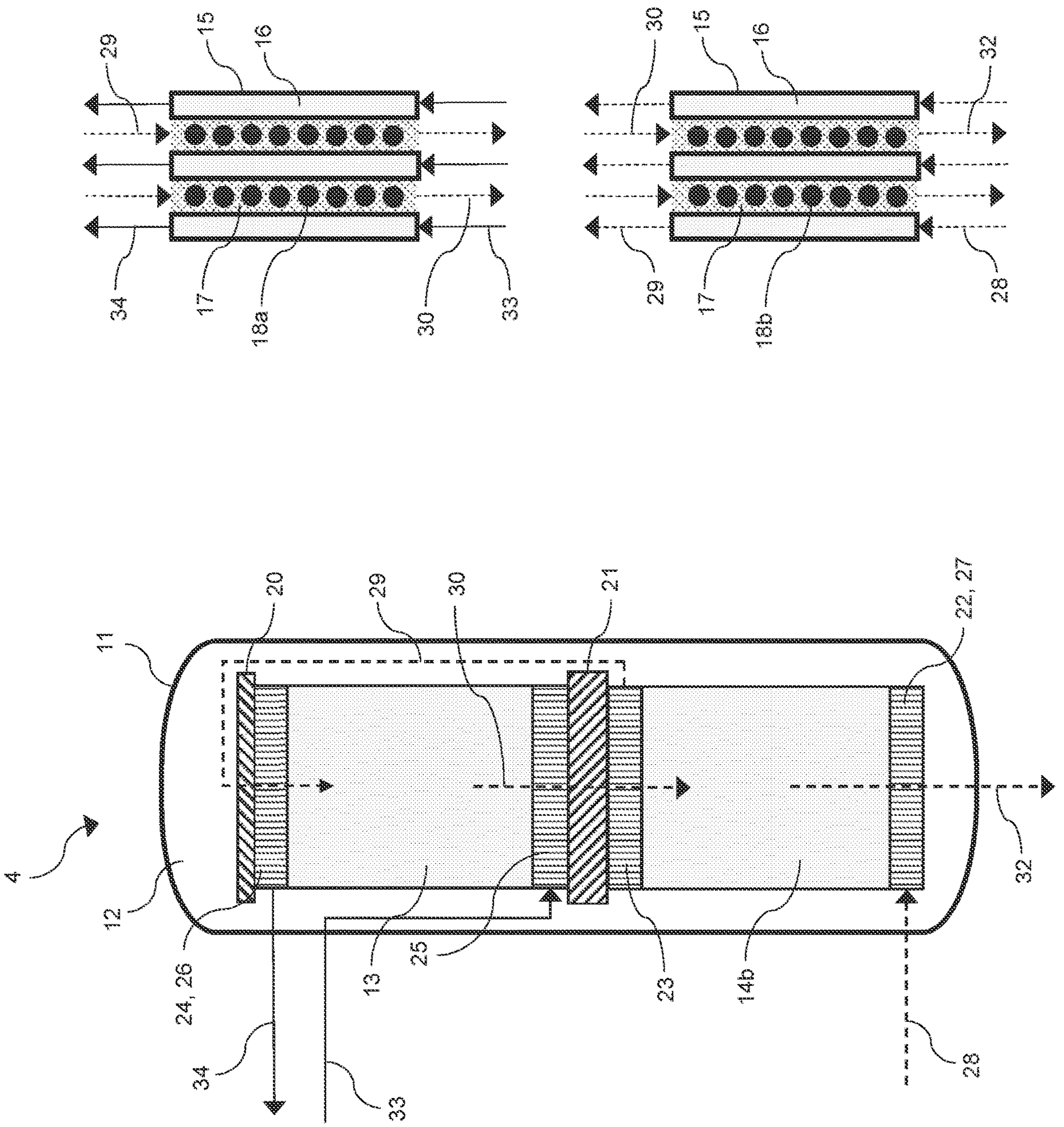
Figure 5:
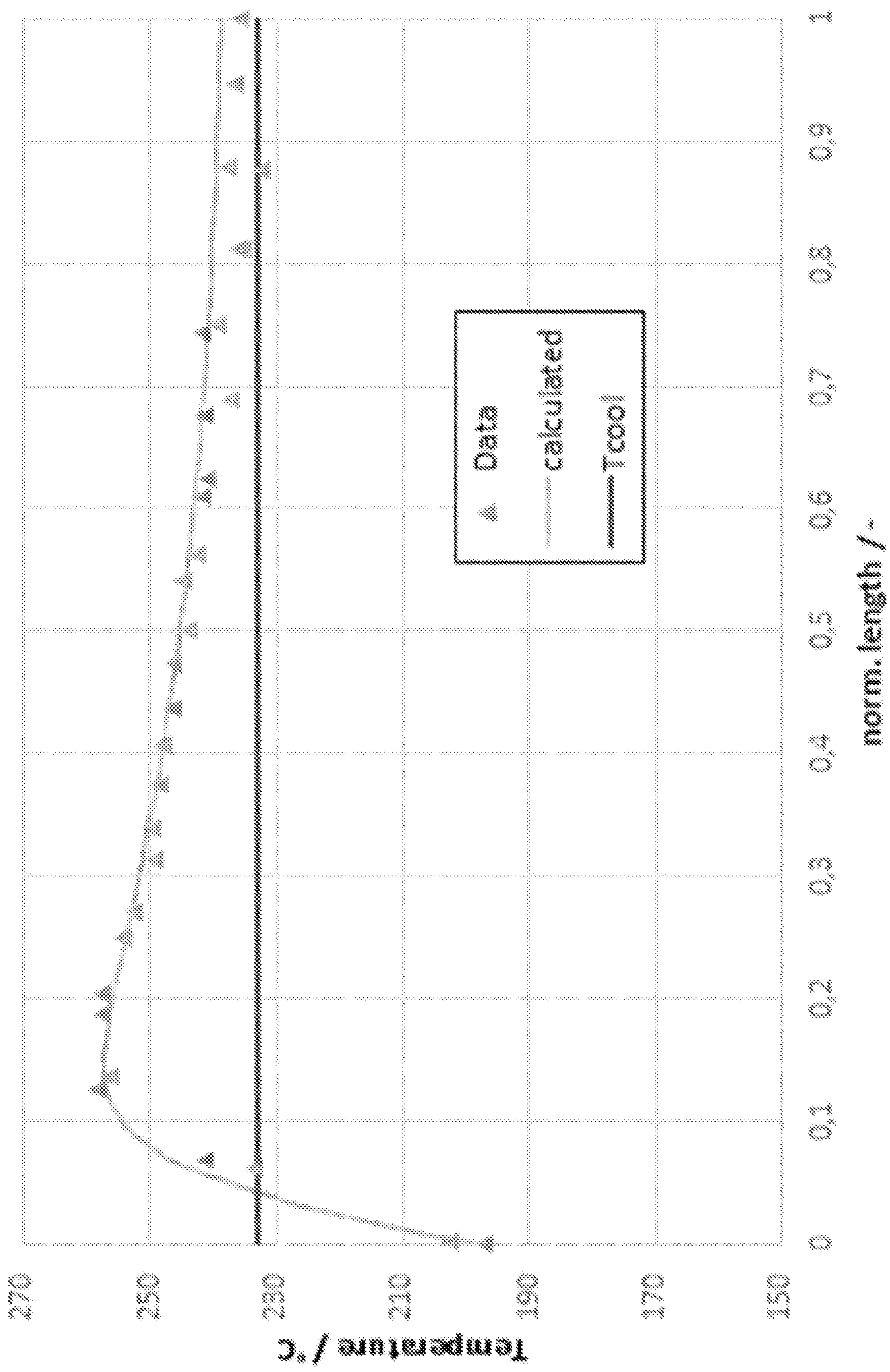

FIG. 1 shows a much simplified schematic representation of a methanol synthesis reactor as per alternative c1 according to a first example of the invention, FIG. 2 shows a much simplified schematic representation of a methanol synthesis reactor as per alternative c1 according to a second example of the invention, FIG. 3 shows a much simplified schematic representation of a methanol synthesis reactor as per alternative c2 according to a third example of the invention, FIG. 4 shows a much simplified schematic representation of a methanol synthesis reactor as per alternative c2 according to a first example of the invention, FIG. 5 shows a typical temperature profile of a catalyst bed over the length of a methanol reactor as determined by measurement and by means of a simulation.

DETAILED DESCRIPTION OF THE PREFERRED EMBODIMENTS

FIG. 1 shows a highly simplified schematic representation (outline sketch) of a methanol synthesis reactor 1 according to a first example of the invention. According to alternative c1 the methanol synthesis reactor 1 has a first process unit 13 which is in the form of a reactor stage RS1. Furthermore and according to alternative c1 the methanol synthesis reactor 1 has a second process unit 14*a* which is configured as a cooling stage.

The methanol synthesis reactor 1 is shown in a front view on the left-hand side of FIG. 1. FIG. 1 further shows a side view of a portion of the first process unit 13 at the top right and a side view of a portion of the second process unit 14*a* at the bottom right.

The methanol synthesis reactor 1 according to FIG. 1 shows a pressure jacket 11 in whose interior 12 a first process unit 13 and a second process unit 14*a* are arranged. The first process unit 13 is arranged in an upper portion of the interior 12 while the second process unit 14*a* is arranged in a lower portion of the interior 12 and below the first process unit 13. Both process units 13 and 14*a* are fluidically interconnected, for example via corresponding pipe conduits of distributor and collector systems (not shown).

The methanol synthesis reactor 1 is in the form of a one-stage reactor having a reactor stage RS1 and a cooling stage. The reactor stage RS1 is formed by the first process unit 13 and the cooling stage by the second process unit 14*a*. Boiling boiler feed water is used as the cooling media stream CM1 in the first reactor stage. The cooling media stream CM2 used in the cooling stage is the synthesis gas stream which is also used in the reactor stage RS1 for converting into methanol over a catalyst bed CB1. The synthesis gas stream is preheated in the second process unit 14*a* and may subsequently be introduced as preheated synthesis gas stream into the first process unit 13 for conversion into methanol.

The first process unit 13 is in the form of a plate heat exchanger, wherein the plate heat exchanger comprises a multiplicity of traversable (heat exchanger) plates which are in the form of pillow plates (pillow plate structure not shown). The plates are arranged vertically and are accordingly traversed in the vertical direction. The plates 15 each have a traversable plate interior 16 which is traversed from bottom to top by the cooling media stream CM1 33. The stream of the fresh cooling medium CM1 33 enters a plate 15 from below and exits from the top of the relevant plate 15 as a stream of exhausted cooling medium CM1 34. The fresh cooling media stream CM1 33 is boiling boiler feed water. The exhausted cooling media stream CM1 34 is steam. Two adjacent plates 15 of the first process unit 13 are spaced apart from one another such that they form a plate interspace 17. Pellets of a methanol synthesis catalyst, indicated by the black dots, are arranged in the plate interspaces 17. The entirety of the catalyst pellets form the catalyst bed CB1 18*a*. A preheated synthesis gas stream 29 enters the plate interspaces 17 from above and is at least partially converted into a mixture of methanol and water (raw methanol) in an exothermic reaction over the catalyst bed CB1 18*a*. The plate interspaces are cooled, and the temperature in the plate interspaces thus controlled, by the cooling media stream CM1 33 in countercurrent. In the context of this exothermic reaction a product stream RP1 comprising at least methanol, water and unconverted synthesis gas (residual gas) is formed. This product stream RP1 30 exits from the bottom of the plate interspaces 17.

The second process unit 14*a* is also in the form of a plate heat exchanger, wherein the plate heat exchanger comprises a multiplicity of traversable (heat exchanger) plates 15 which are in the form of pillow plates (pillow plate structure not shown). The plates are arranged vertically and are accordingly traversed in the vertical direction. The plates 15 of the second process unit each have a traversable plate interior 16 which is traversed from bottom to top by the cooling media stream CM2 28. The stream of the fresh cooling medium CM2 28 enters the plate 15 from below and exits from the top of the plate 15 as a stream of exhausted cooling medium CM2 29. The fresh cooling media stream CM2 28 is the synthesis gas stream. The exhausted cooling media stream CM2 29 is the preheated synthesis gas stream.

Two adjacent plates 15 of the second process unit 14*a* are spaced apart from one another such that they form a plate interspace 17. In contrast to the plate interspaces of the first process unit 13, the plate interspaces 17 of the second process unit do not have a methanol synthesis catalyst arranged in them since the second process unit is used only for cooling and optionally condensing the methanol-containing product stream RP1 30. The plate interspaces 17 traversed from top to bottom by the methanol-containing product stream RP1 30 are cooled by the cooling media stream CM2 28 in countercurrent, thus cooling the initially hot methanol-containing product stream RP1 30 to afford the cold methanol-containing product stream RP1 31. Depending on the configuration of the second process unit 14*a* the methanol-containing product stream RP1 31 may be obtained in merely cooled but still gaseous form, in partially condensed form or in completely condensed form with respect to the condensable proportions.

As is shown on the right hand side of FIG. 1, the traversable plates 15 with their plate interiors 16 and the plate interspaces 17 of the first and second process unit 13 and 14*a* are each arranged in serial alignment with one another. In other words, the plates and plate interspaces of the first and second process unit 13 and 14*a* are each arranged in series along a common longitudinal axis.

The first process unit 13 of the methanol synthesis reactor 1 is mechanically connected to the pressure jacket 11 via a support structure 19, the support structure 19 thus establishing a mechanical connection between the first process unit and the pressure jacket 11 (connection to pressure jacket in plane of the drawing). The support structure 19 is in the form of a propping means and at least partially arranged below the first process unit 13. In contrast to an arrangement at the side of the first process unit 13 this arrangement has the advantage that the diameter of the methanol synthesis reactor 1 is not significantly affected, in particular not significantly increased. The configuration of the support structure 19 as a propping means allows the first process unit to expand freely upwards. This especially refers to the packet of the heat exchanger plates and components mechanically connected thereto. Components mechanically connected to the heat exchanger plates are in particular the collector and distributor systems 24, 25 and 26.

The second process unit 14*a* of the methanol synthesis reactor 1 is mechanically connected to the pressure jacket 11 via a support structure 20, the support structure 20 thus establishing a mechanical connection between the second process unit and the pressure jacket 11 (connection to pressure jacket in plane of the drawing). The support structure 20 is in the form of a suspending means and at least partially arranged above the first process unit 14*a*. In contrast to an arrangement at the side of the second process unit 14*a* this arrangement has the advantage that the diameter of the methanol synthesis reactor 1 is not significantly affected, in particular not significantly increased. The configuration of the support structure 20 as a suspending means allows the second process unit 14*a* to expand freely downwards. This especially refers to the packet of the heat exchanger plates and components mechanically connected thereto. Components mechanically connected to the heat exchanger plates are in particular the collector and distributor systems 22, 23 and 27.

The flow management in the inventive reactor 1 is elucidated hereinbelow. The synthesis gas stream 28 enters the methanol synthesis reactor 1 via a synthesis gas inlet port (not shown) which extends through the pressure jacket 11 in the horizontal direction. The synthesis gas stream 28 is subsequently distributed via a distributor system 22 (shown in simplified form and for simplicity as part of a block with the components 22, 27) to the individual plate interiors 16 of the first process unit. The synthesis gas subsequently flows from bottom to top through the plate interiors 16, thus cooling the product stream RP1 30 on the side of the plate interspaces 17 in countercurrent. The synthesis gas stream 28 fulfils the function of the cooling media stream CM2. The preheated synthesis gas stream 29 or exhausted cooling media stream CM2 is combined in a collector system 23 and passed to the top of the first process unit via a bypass conduit (indicated by the dashed line). The preheated synthesis gas stream 29 there enters a distributor system 24 (shown in simplified form and for simplicity as part of a block with the components 24, 26) which distributes the synthesis gas over the plate interspaces 17 of the first process unit. In the plate interspaces 17 of the first process unit the preheated synthesis gas reacts over the methanol synthesis catalyst of the catalyst bed to afford methanol and water and thus forms the product stream RP1 30 which also comprises unconverted synthesis gas (residual gas). The product stream RP1 30 flows from top to bottom and is withdrawn from the first process unit 13 in the bottom region thereof, flows through an interspace region (not shown) and subsequently enters the plate interspaces 17 of the second process unit 14*a* for cooling. The cooled product stream RP1 31 is combined using a collector system 27 (shown in simplified form and for simplicity as part of a block with the components 22, 27) and discharged from the reactor via a product stream outlet port (not shown). The thus-obtainable raw product is subsequently sent to a further treatment (for example further cooling and gas-liquid separation) and workup (for example distillation).

The interspace region between the first and the second process unit may likewise exhibit a corresponding collector system for the product stream RP1 in the bottom region of the first process unit 13 and a corresponding distributor system for the product stream RP1 at the top region of the second process unit 14*a*.

The fresh cooling media stream CM1 33 enters the reactor via a horizontally arranged cooling media inlet port (not shown) which extends through the pressure jacket 11 and is distributed to the plate interiors 16 of the first process unit 13 via a distributor system 25. This causes the boiling boiler feed water used for the cooling media stream CM1 33 to evaporate, thus effecting a cooling of the product stream RP1 formed on the plate interspaces. The steam or exhausted cooling media stream CM1 34 is combined in a collector system 26 (shown in simplified form and for simplicity as part of a block with the components 24, 26) and discharged from the reactor 1 via a horizontally arranged cooling media outlet port which extends through the pressure jacket.

The examples according to FIGS. 2 to 4 will not be elucidated in detail again below. Only differences with respect to the example of FIG. 1 will be addressed.

FIG. 2 shows a highly simplified schematic representation (outline sketch) of a methanol synthesis reactor 2 according to a second example of the invention. According to alternative c1 the methanol synthesis reactor 2 also has a first process unit 13 which is in the form of a reactor stage RS1. Furthermore and according to alternative c1 the methanol synthesis reactor 2 has a second process unit 14*a* which is configured as a cooling stage.

The methanol synthesis reactor 2 of FIG. 2 differs decisively from the methanol synthesis reactor 1 of FIG. 1 in terms of the type of mechanical fixing of the first and second process units 13 and 14*a*. Otherwise the methanol synthesis reactor 2 is also configured as a single-stage reactor having a first process unit 13 in the form of a water-cooled reactor stage RS1 and a second process unit 14*a* in the form of a gas-cooled cooling stage 14*a*.

The methanol synthesis reactor 2 according to the example of FIG. 2 has only one mechanical support structure 20 which mechanically connects the first process unit 13 to the pressure jacket 11. The support structure 20 thus establishes a mechanical connection between the first process unit 13 and the pressure jacket 11 (connection to the pressure jacket in plane of the drawing). This support structure 20 is in the form of a suspending means and at least partially arranged above the first process unit 13. In contrast to an arrangement at the side of the first process unit 13, and as already mentioned in connection with the example of FIG. 1, this arrangement has the advantage that the diameter of the methanol synthesis reactor 2 is not significantly affected, in particular not significantly increased.

In contrast to the example of FIG. 1 the second process unit 14*a* is not mechanically connected to the pressure jacket 11 via a support structure. On the contrary, the first process unit 13 and the second process unit 14*a* are mechanically connected to one another via a connecting element 21. However, the connecting element 21 does not establish a mechanical connection to the pressure jacket 11. As a result the first process unit 13 and the second process unit 14*a* can freely expand downwards. Especially in the case of large steam amounts in respect of the cooling media stream CM1 34 this embodiment has the advantage that the feed conduit of the cooling media stream CM1 33 may be made mechanically more flexible in contrast to the embodiment of FIG. 1.

FIG. 3 shows a highly simplified schematic representation (outline sketch) of a methanol synthesis reactor 3 according to a third example of the invention. According to alternative c2 the methanol synthesis reactor 3 has a first process unit 13 which is in the form of a reactor stage RS1. Furthermore and according to alternative c2 the methanol synthesis reactor 3 has a second process unit 14*b* which is configured as a further or second reactor stage RS2.

In contrast to the examples of the methanol synthesis reactor according to FIGS. 1 and 2 the methanol-containing product stream RP1 30 exiting the first process unit 13 is not only cooled in the second process unit 14*b* but rather also converted into a methanol-containing product stream RP2 32. This is made possible because the methanol-containing product stream RP1 30 comprises unconverted synthesis gas (carbon oxide(s) and hydrogen) due to the establishment of a thermodynamic equilibrium. This unconverted synthesis gas or residual gas is further converted into methanol and water on the plate interspace side, i.e. within the plate interspaces 17 of the second process unit 14*b* over the catalyst bed CB2 18*b* arranged therein. The cooling of this exothermic reaction is carried out via the synthesis gas stream 28 or fresh cooling media stream CM2 28 introduced in the bottom region of the second process unit. Accordingly the methanol synthesis reactor 3 is in the form of a two-stage reactor, wherein the first reactor stage (process unit 13) is configured as a water-cooled reactor stage RS1 with boiling boiler feed water as cooling media stream CM1 33 and the second reactor stage RS2 is configured as a gas-cooled reactor stage with synthesis gas as cooling media stream CM2 28.

The mechanical fixing of the first and second process unit 13 and 14*b* to the pressure jacket 11 via the support structures 19 and 20 corresponds to the mechanical fixing as shown and described for the example of the methanol synthesis reactor 1 in FIG. 1.

FIG. 4 shows a highly simplified schematic representation (outline sketch) of a methanol synthesis reactor 4 according to a fourth example of the invention. According to alternative c2 the methanol synthesis reactor 4 has a first process unit 13 which is in the form of a reactor stage RS1. Furthermore and according to alternative c2 the methanol synthesis reactor 4 has a second process unit 14*b* which is configured as a further or second reactor stage RS2. As in the example of the reactor according to FIG. 3, the methanol synthesis reactor 4 is also in the form of a two-stage reactor, wherein the first reactor stage RS1 is configured as a water-cooled reactor stage and the second reactor stage RS2 is configured as a gas-cooled reactor stage.

The mechanical fixing of the first and second process unit 13 and 14*b* to the pressure jacket 11 via the support structure 20 and the connection of the first and second process unit 13 and 14*b* via the connecting element 21 corresponds to the configuration as shown and described for the example of the methanol synthesis reactor 2 in FIG. 2.

LIST OF REFERENCE SYMBOLS

1, 2, 3, 4 Methanol synthesis reactor
11 Pressure jacket
12 Interior
13 First process unit (reactor stage RS1)
14*a* Second process unit (cooling stage)

14*b* Second process unit (reactor stage RS2)
(Heat exchanger) plate
16 Plate interior
17 Plate interspace
18*a* Catalyst bed CB1
18*b* Catalyst bed CB2
19 Propping means (support structure)
20 Suspending means (support structure)
21 Connecting element
22 Distributor system (for synthesis gas stream)
23 Collector system (for preheated synthesis gas stream)
24 Distributor system (for preheated synthesis gas stream)
25 Distributor system (for cooling medium)
26 Collector system (for cooling medium)
27 Collector system for product stream RP1 or RP2)
28 Synthesis gas stream (cooling media stream CM2, fresh)
29 Preheated synthesis gas stream (cooling media stream CM2, exhausted)
30 Product stream RP1
31 Cooled product stream RP1
32 Product stream RP2
33 Cooling media stream CM1, fresh
34 Cooling media stream CM1, exhausted It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A methanol synthesis reactor for producing methanol from a synthesis gas mixture comprising:

(a) a pressure jacket having an interior, wherein at least a first process unit and a second process unit fluidically interconnected are arranged one atop the other in the interior;

(b) a first process unit, wherein the first process unit is configured as a reactor stage RS1 for synthesis of methanol from a synthesis gas stream over a catalyst bed CB1, thus making it possible to produce a methanol-containing product stream RP1, and the first process unit is in the form of a plate heat exchanger, wherein the first process unit comprises a multiplicity of plates arranged vertically and parallel to one another with traversable plate interiors and plate interspaces are present between adjacent plates, wherein a solid methanol synthesis catalyst forming the catalyst bed CB1 is arranged in the plate interspaces and the first process unit is configured such that the plate interspaces are traversable from top to bottom by the synthesis gas stream and/or by the methanol-containing product stream RP1 and the plate interiors are traversable from bottom to top by a first cooling media stream CM1, thus making the methanol-containing product stream RP1 coolable in countercurrent by the first cooling media stream CM1, and wherein the first process unit comprises means for withdrawing the methanol-containing product stream RP1 from the first process unit;

(c) a second process unit arranged below the first process unit, wherein the second process unit is in the form of a plate heat exchanger, wherein the second process unit comprises a multiplicity of plates arranged vertically and parallel to one another with traversable plate interiors, and plate interspaces are present between adjacent plates, wherein the second process unit is configured such that the plate interiors are traversable from bottom to top by a second cooling media stream CM2 and wherein (c1) the second process unit is in the form of a cooling stage and configured such that the plate interspaces are traversable from top to bottom by the methanol-containing product stream RP1, thus making the methanol-containing product stream RP1 coolable in countercurrent by the second cooling media stream CM2 or (c2) the second process unit is in the form of a reactor stage RS2 and configured for synthesis of methanol from the methanol-containing product stream RP1 withdrawable from the first process unit over a catalyst bed CB2, thus configuring the methanol synthesis reactor to produce a methanol-containing product stream RP2, and wherein a solid methanol synthesis catalyst forming the catalyst bed CB2 is arranged in the plate interspaces and the second process unit is configured such that the plate interspaces are traversable from top to bottom by the methanol-containing product stream RP1 and/or the methanol-containing product stream RP2, thus making the methanol-containing product stream RP2 coolable in countercurrent by the second cooling media stream CM2.

2. The methanol synthesis reactor according to claim 1, wherein the plates of the first process unit and/or the plates of the second process unit are in the form of pillow plates.

3. The methanol synthesis reactor according to claim 1, wherein the second process unit is configured such that the plate interiors are traversable by the synthesis gas stream, wherein the synthesis gas stream fulfils the function of the second cooling media stream CM2, thus configuring the methanol synthesis reactor to produce a preheated synthesis gas stream.

4. The methanol synthesis reactor according to claim 3, wherein the methanol synthesis reactor comprises a means for discharging the preheated synthesis gas stream from the second process unit and comprises a means for introducing the preheated synthesis gas stream into the first process unit to produce the methanol-containing product stream RP1.

5. The methanol synthesis reactor according to claim 1, wherein the plate interiors of the first process unit and the plate interiors of the second process unit are arranged at least partially in serial alignment and/or the plate interspaces of the first process unit and the plate interspaces of the second process unit are arranged at least partially in serial alignment.

6. The methanol synthesis reactor according to claim 1, wherein the methanol synthesis reactor comprises a support structure, wherein the support structure is in the form of a propping means which is at least partially arranged below a process unit and/or in the form of a suspending means arranged at least partially above a process unit and thus forms a mechanical connection between a process unit and the pressure jacket.

7. The methanol synthesis reactor according to claim 6, wherein the first process unit has a support structure which is arranged at least partially below the first process unit and is in the form of a propping means and the second process unit has a support structure which is arranged at least partially above the second process unit and is in the form of a suspending means.

8. The methanol synthesis reactor according to claim 6, wherein the first process unit has a support structure which is arranged at least partially above the first process unit and is in the form of a suspending means and wherein the first and the second process unit are mechanically connected to one another via a connecting element.

9. The methanol synthesis reactor according to claim 3, further comprising a synthesis gas inlet port extending through the pressure jacket, wherein the synthesis gas inlet port is fluidically connected to the plate interiors of the second process unit and is configured for introducing the synthesis gas stream into the second process unit.

10. The methanol synthesis reactor according to claim 9, wherein the second process unit comprises in the bottom region a distributor system which is fluidically connected to the synthesis gas inlet port and the plate interiors of the second process unit and is configured for distributing the synthesis gas stream entering via the synthesis gas inlet port to the plate interiors of the second process unit.

11. The methanol synthesis reactor according to claim 3, wherein the second process unit comprises in the top region a collector system which is fluidically connected to the plate interiors of the second process unit and is configured for collecting the preheated synthesis gas stream exiting from the plate interiors of the second process unit.

12. The methanol synthesis reactor according to claim 11, wherein the first process unit comprises in the top region a distributor system which is fluidically connected to the collector system of the second process unit and configured for distributing the preheated synthesis gas to the plate interspaces of the first process unit.

13. The methanol synthesis reactor according to claim 12, wherein the collector system of the second process unit and the distributor system of the first process unit are connected via a conduit bypassing the first process unit and at least partially running inside the pressure jacket.

14. The methanol synthesis reactor according to claim 1, wherein the first cooling media stream CM1 comprises boiling boiler feed water and the first cooling media stream CM1 is especially evaporable upon traversal of the plate interiors of the first process unit.

15. The methanol synthesis reactor according to claim 1, wherein an interspace region is arranged within the pressure jacket between the first process unit and the second process unit, wherein the interspace region is fluidically connected to the plate interspaces of the first process unit and the plate interspaces of the second process unit) and is configured for transferring the methanol-containing product stream RP1 from the first process unit into the second process unit.

* * * * *